United States Patent
Guo et al.

(10) Patent No.: US 7,583,583 B2
(45) Date of Patent: Sep. 1, 2009

(54) SYSTEM AND METHOD FOR REDUCING PEAK-TO-AVERAGE POWER RATIO IN ORTHOGONAL FREQUENCY DIVISION MULTIPLEXING SIGNALS USING RESERVED SPECTRUM

(75) Inventors: Ning Guo, Kanata (CA); Neil McGowan, Stittsville (CA); Gary Boudreau, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 541 days.

(21) Appl. No.: 11/300,508

(22) Filed: Dec. 15, 2005

(65) Prior Publication Data

US 2007/0140101 A1    Jun. 21, 2007

(51) Int. Cl.
*H04J 9/00* (2006.01)
*H04J 11/00* (2006.01)

(52) U.S. Cl. ................. 370/204; 370/207; 370/208
(58) Field of Classification Search ............... 370/204, 370/207
See application file for complete search history.

(56) References Cited

U.S. PATENT DOCUMENTS

| | | | |
|---|---|---|---|
| 2001/0006359 A1* | 7/2001 | Suzuki et al. | 333/14 |
| 2002/0168016 A1* | 11/2002 | Wang et al. | 375/260 |
| 2003/0054851 A1 | 3/2003 | Jo et al. | |
| 2005/0232135 A1* | 10/2005 | Mukai et al. | 370/208 |
| 2007/0019537 A1* | 1/2007 | Paulraj | 370/203 |

FOREIGN PATENT DOCUMENTS

WO    2005043853    5/2005

OTHER PUBLICATIONS

On The Uniform Companding Transform for Reducing PAPR of MCM Signals, Tao Jiang, Nov. 27, 2006.*
On The RF/DSP Design for Efficiency of OFDM Transmitters, Mohamed Helaoui, Jul. 2005.*

* cited by examiner

*Primary Examiner*—William Trost, IV
*Assistant Examiner*—Roberta A Shand
(74) *Attorney, Agent, or Firm*—Jeffrey M. Measures; Borden Ladner Gervais LLP

(57) ABSTRACT

A method and apparatus for reducing the peak to average power ratio of an OFDM signal. The method involves operating on the signal only after it is converted to the time domain where the signal is compared to a power threshold and any signal above the power threshold is considered undesirable. A reduced signal is produced by reducing the magnitude to the power threshold whenever it exceeds that threshold. The delta between the original signal and reduced signal is the clipped signal. The clipped signal is multiplied by a g-function, and then subtracted from the original signal to produce a first iteration of a peak-reduced signal. The process can then be repeated using the first peak-reduced signal in place of the original signal to produce the second iteration of a peak-reduced signal. This process can be repeated each time bringing the peaks closer to the power threshold. The g-function can be defined either to allow for per-symbol cyclic signal processing or non-cyclic processing that is symbol time independent.

18 Claims, 3 Drawing Sheets

SYSTEM AND METHOD FOR REDUCING PEAK-TO-AVERAGE POWER RATIO IN ORTHOGONAL FREQUENCY DIVISION MULTIPLEXING SIGNALS USING RESERVED SPECTRUM

FIELD OF THE INVENTION

This invention relates generally to control of power and more specifically to peak power regulation.

BACKGROUND OF THE INVENTION

In the rapidly expanding field of wireless digital communications, demand continues to increase for reliable wireless systems that have a high spectral efficiency. Accordingly, the use of Orthogonal Frequency Division Multiplexing (OFDM) technology is increasing within wireless applications such as cellular and Personal Communication Systems (PCS). OFDM has a high tolerance to multipath signals and is spectrally efficient which makes it a good choice for future wireless communication systems. Utilization of OFDM technology will continue to be significant as such technology is incorporated within new standards currently being defined.

More specifically, OFDM is a special form of multicarrier modulation that uses Digital Signal Processor (DSP) algorithms like Inverse Fast Fourier Transform (IFFT) to generate waveforms that are mutually orthogonal and Fast Fourier Transform (FFT) for demodulation operations. In a typical OFDM signal format, the IFFT modulator operation may be represented by Equation 1 (Eq.1), and the FFT demodulator operation may be represented by Equation 2 (Eq.2).

$$x_n = \sum_{\substack{k=-(N-1)/2 \\ k \neq 0}}^{(N-1)/2} X_k \cdot e^{j2\pi kn/N} \quad \text{Eq. 1}$$

$$X_k = \frac{1}{N} \sum_{n=-(N-1)/2}^{(N-1)/2} x_n \cdot e^{-j2\pi kn/N} \quad \text{Eq. 2}$$

Equations 1 and 2 can be written in vector format as $x=QX$ and $X=Fx$, where Q and F is the IFFT and FFT matrixes with elements $q_{n,k}$ and $f_{n,k}$, respectively, and in accordance with Equations 3 (Eq.3) and 4 (Eq.4).

$$q_{n,k} = e^{j2\pi kn/N} \quad \text{Eq. 3}$$

$$f_{n,k} = \frac{1}{N} e^{-j2\pi kn/N} \quad \text{Eq. 4}$$

While OFDM has existed for some time, OFDM has only recently become widely implemented in high-speed digital communications due to advancements in Very Large-Scale Integrated Circuit (VLSI) technologies and related DSP design and fabrication. OFDM has gained a lot of interest in diverse digital communication applications due to its favorable properties like high spectral efficiency, robustness to channel fading, immunity to impulse interference, uniform average spectral density, and capability of handling very strong echoes.

OFDM technology is now used in many new broadband communication schemes and many other wireless communication systems. However, there are some concerns with regard to OFDM. Such concerns include high Peak-to-Average Power Ratio (PAPR) and frequency offset. High PAPR causes saturation in power amplifiers, leading to intermodulation products among the subcarriers and disturbances of out-of-band energy. Therefore, it is desirable to reduce the PAPR. In order to meet the out-of-band emissions requirements, a power amplifier and other components with this high PAPR input are required to provide good linearity in a large dynamic range. This makes the power amplifier one of the most expensive components within the communication system. The high PAPR also means that the power amplifier operation has low power efficiency that reduces battery life for related mobile stations.

Another concern of OFDM is that the peak of the signal can be up to N times the average power (where N is the number of carriers). These large peaks increase the amount of intermodulation distortion resulting in an increase in the error rate. The average signal power must be kept low in order to prevent the transmitter amplifier limiting. Minimizing the PAPR allows a higher average power to be transmitted for a fixed peak power, improving the overall signal to noise ratio at the receiver. It is therefore important to reduce or otherwise minimize the PAPR. The plain PAPR without any reduction for a given OFDM symbol can be defined by Equation 5 (Eq.5). Whereas, the obtained PAPR with a reduction algorithm $f_{PAPR}$ for a given OFDM symbol can be defined by Equation 6 (Eq.6).

$$PAPR_p = \frac{\|x\|_\infty^2}{E[\|x\|_2^2]/N} = \frac{\max_n \{|x_n|^2\}}{E[\|x\|_2^2]/N} \quad \text{Eq. 5}$$

$$PAPR(f_{PAPR}) = \frac{\|f_{PAPR}(x)\|_\infty^2}{E[\|f_{PAPR}(x)\|_2^2]/N} = \frac{\max_n \{|f_{PAPR}(x_n)|^2\}}{E[\|f_{PAPR}(x)\|_2^2]/N} \quad \text{Eq. 6}$$

The PAPR of an OFDM signal can be reduced by several different PAPR reduction methods. Such methods can be classified into two groups including Constellation Shaping (CS) (e.g., distortionless or active constellation expansion) and Tone Reservation (TR). With CS methods, the modulation constellation is changed such that the obtained PAPR is less than the required value with the satisfied channel error criteria. With TR methods, the reserved tones are assigned with such values that the obtained PAPR is less than the required value with the satisfied channel error criteria. In the tone reservation method, the basic idea is to reserve a small set of tones for PAPR reduction. Computing the values for these reserved tones that minimize the PAPR can advantageously be formulated as a convex problem and can be solved exactly. The amount of PAPR reduction depends on the number of reserved tones, their locations within the frequency vector, and the amount of complexity. Known TR methods typically have high complexity and involve iterations that convert the signal back and forth between the frequency domain and the time domain. Other methods of reducing PAPR are also possible but they affect signal quality or Error-Vector Magnitude (EVM).

It is, therefore, desirable to provide an optimal TR method that can reduce the PAPR of OFDM signals input to power amplifiers. Such an optimal TR method should reduce the peaks of the compounded input signals such that a less expensive power amplifier can be utilized with out-of-band emissions still being fully controlled. This optimal TR method should also be relatively inexpensive and any degradation in terms of in-band signal quality should be within an acceptable range.

SUMMARY OF THE INVENTION

It is an object of the present invention to obviate or mitigate at least one disadvantage of previous TR methods.

The present invention is directed to peak power and envelope magnitude regulators that function preferably within an OFDM transmitter. These regulators operate to reduce peak power spikes within input signals, controlling the out-of-band emissions, and maintaining the in-band signal quality within an acceptable degradation.

The present invention, according to a first aspect, is a method of reducing a peak-to-average power ratio in communications signals using reserve tones, the method comprising: obtaining a communications symbol; for n iterations, where n is an integer, subjecting the communications symbol to a hard limiter; defining clip signal components of the communications symbol; filtering the clip signal components using a g-function; providing a delay in conjunction with the defining and filtering steps so as to form a delayed communications symbol; and subtracting an output of the filtering step from the delayed communications symbol so as to produce an output signal y(n) having reduced PAPR.

According to a second broad aspect, the present invention is a filtering apparatus for use within a peak power regulator, the apparatus comprising: an iteration control mechanism for introducing n iterations of a communications symbol, where n is an integer; a hard limiter; a means for forming clip signal components of the communications symbol; a g-function filter for filtering the clip signal components; a delay mechanism in cooperation with said means for forming clip signal components and said g-function filter, said delay mechanism providing a delayed communications symbol; and a means for subtracting an output of said g-function filter from said delayed communications symbol so as to produce an output signal y(n) having a reduced PAPR.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
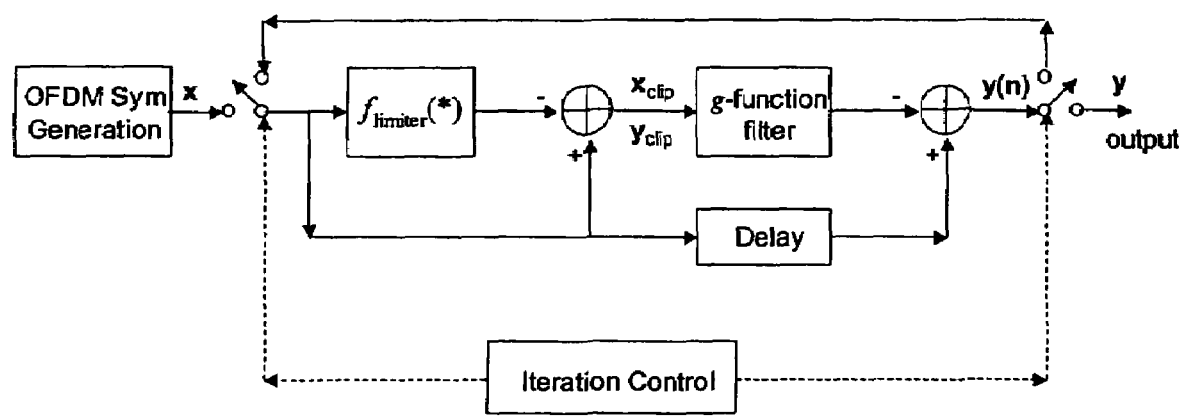
FIG. 1 is a block diagram of cyclic filtering with the g-function is shown in accordance with the present invention.

Generally, the present invention provides a method and apparatus for reducing the peak to average power ratio of an OFDM or Orthogonal Frequency Division Multiple Access (OFDMA) signal such as, but not limited to, WiMAX signals. The method operates on the signal only after it is converted to the time domain. The signal is compared to a power threshold and any signal above the power threshold is considered undesirable. A reduced signal is produced by reducing the magnitude to the power threshold whenever it exceeds that threshold. The delta between the original signal and reduced signal is the clipped signal. The clipped signal is multiplied by a g-function (a special type of filter function), and then subtracted from the original signal to produce a first iteration of a peak-reduced signal. The process can then be repeated using the first peak-reduced signal in place of the original signal to produce the second iteration of a peak-reduced signal.

This process can be repeated each time bringing the peaks closer to the power threshold. The g-function can be defined either to allow for per-symbol cyclic signal processing or non-cyclic processing that is symbol time independent. The complexity of this invention can be scaled by choosing the number of iterations and the length of the g-function trading off the cost of implementation with signal quality. The inventive method and apparatus can apply to both base station and mobile implementations. This invention can be used in conjunction with previous peak power regulators, such as that disclosed by McGowan within U.S. Pat. No. 6,931,053 herein incorporated by reference in its entirety.

In accordance with the present invention, the instantaneous peaks in an OFDM mobile station or base station transmit signal are clipped and the resulting undesirable spurious emissions are filtered out prior to the high power amplifier stage of the system. The peaks that are removed are only those that would have resulted in undesirable spurious emissions from the high power amplifier. The degree of clipping is controlled such that signal quality or EVM are maintained within the required specifications so that the performance of the OFDM system is preserved. The present invention locates the g-function filter such that when no peaks are above the clipping threshold, the signal is unaffected by the filter.

High peak-to-average signals lead to expensive and low efficiency RF amplifiers in wireless systems. This present invention provides a relatively low complexity method and apparatus to reduce the PAPR of the OFDM/OFDMA signal in the time domain and does not require any conversion back to the frequency domain. This invention is also able to take care of peaks that occur at symbol boundaries that are not addressed by existing TR methods and other OFDM/OFDMA PAPR reduction schemes. Additionally, it is also possible to implement the present invention in a radio or other component of the system that has no knowledge of the original frequency domain OFDM/OFDMA symbols aside from the portion of the spectrum that is reserved. The present invention will be discussed with specific reference to the g-function and its relation to OFDM symbol generation. However, specific structural details well known to one of ordinary skill in the art, such as those disclosed by McGowan within U.S. Pat. No. 6,931,053 and herein incorporated by reference, will not be repeated herein.

The present invention includes a method and apparatus for controlling and reducing PAPR with optimized performance in the terms of PAPR reduction. The invention includes low implementation-related and computational complexity. The invention provides nominal interference introduced due to the PAPR reduction. Further, the invention is scalable, includes flexible system parameters, and does not include any need for side information to be sent to the receiver.

In accordance with the basic principles of the present invention, there is first defined a hard limiter in accordance with Equation 7 (Eq.7) and a clip signal in accordance with Equation 8 (Eq.8).

$$f_{limiter}(x) = \begin{cases} x, & |x| <= M \\ \dfrac{M}{|x|}x, & \text{otherwise} \end{cases} \quad \text{Eq. 7}$$

$$x_{clip} = x - f_{limiter}(x) = \begin{cases} 0, & |x| <= M \\ \left(1 - \dfrac{M}{|x|}\right)x, & \text{otherwise} \end{cases} \quad \text{Eq. 8}$$

In matrix form, the hard limiter and clip signal can be shown by Equation 9 (Eq.9).

$$x_{clip} = x - f_{limiter}(x) \quad \text{Eq. 9}$$

Next, there is designed a matrix G, which is called a mapping matrix. The mapping matrix G includes properties in accordance with Equation 10 (Eq.10) where the computed S is in the reserved tones for any vector s.

$$S = F \cdot (G \cdot s) \quad \text{Eq. 10}$$

The methodology can then be formulated to find the s, such that the minimum PAPR can be reached. This is represented by Equations 11 (Eq.11) and 12 (Eq.12).

$$s^* = \operatorname{argmin}\left\{\dfrac{\|x + G \cdot s\|_\infty^2}{E[\|x + G \cdot s\|_2^2]/N}\right\} = \operatorname{argmin}\left\{\dfrac{\|y\|_\infty^2}{E[\|y\|_2^2]/N}\right\} \quad \text{Eq. 11}$$

where $$y = x + G \cdot s \quad \text{Eq. 12}$$

Figure 3:
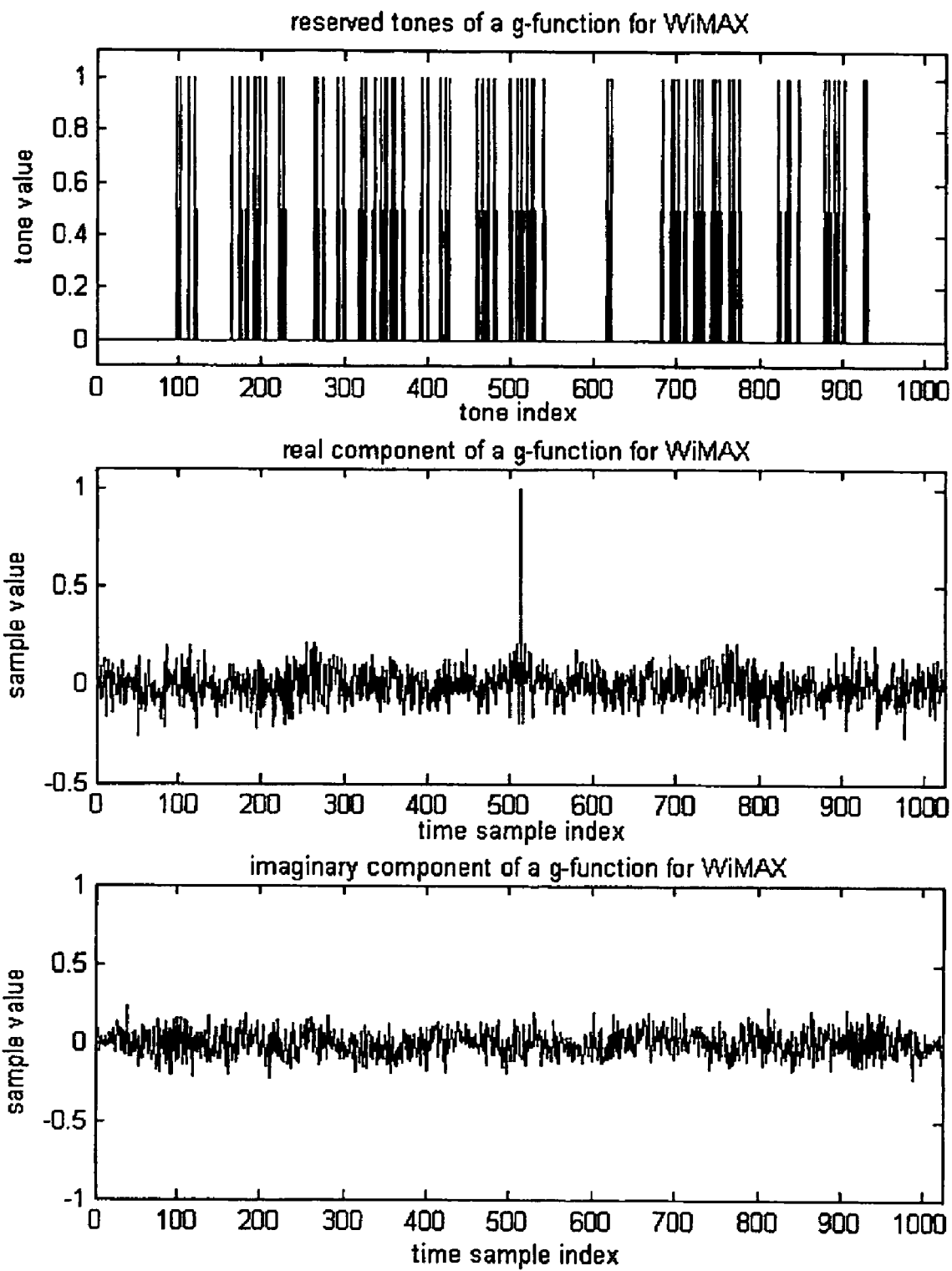
FIG. 3 is a graphical illustration of a g-function and related reserve tones in a specific implementation of the present invention.

With such mapping, it should be noted that there is no need to perform projections between time and frequency domains in order to minimize the PAPR. Thus, PAPR control and reduction may be effected in an iterative manner in accordance with Equation 13 (Eq.13).

$$y(n) = y(n-1) - \xi \cdot G y_{clip}(n-1) \quad \text{Eq. 13}$$

Where $y(n)$ is denoted as the time-domain signal and $y_{clip}(n)$ the clip signal, in the n-th iteration, respectively., and $\xi$ is a positive constant between 0 and 1. Moreover, it is preferred that the value of $\xi$ is 0.5 in conjunction with the "normalized" g-function as shown by way of example in FIG. 3. It should be noted that the vector x is denoted as the time-domain signal in the n-th iteration with $x_{clip}$ as the clip signal.

While different TR methods for PAPR reduction and control are possible and may produce different performances for different situations, and have different implementation requirements, the present method can produce superior performance with a limited number of iterations. It is noted that such methods may be in terms of a matrix form of algorithm, but that there are ways to change the processing into other forms without straying from the intended scope of the present invention. For example, the G matrix may be designed as a Toeplitz matrix such that each row or column of the matrix can be expressed as a cyclic shift of a vector, g, hereinafter referred to as a g-function. In such form, it should be readily apparent that all the matrix multiplications with the G matrix in the algorithms can be implemented as cyclic filtering with the g-function. In accordance with such processing, the projections between the time and frequency domains via FFT are advantageously no longer needed.

Figure 2:
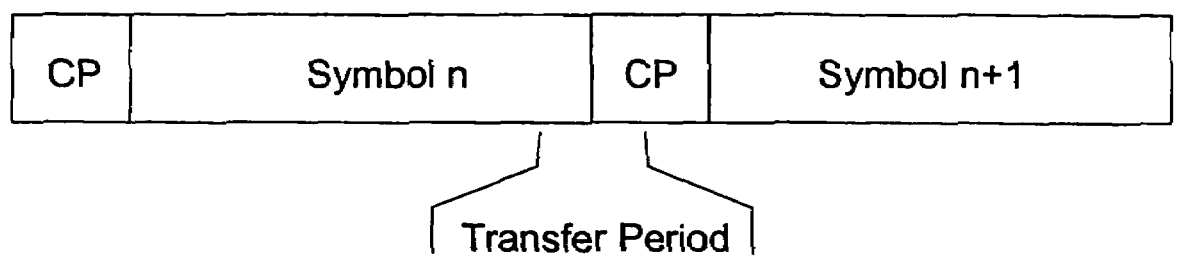
FIG. 2 is a diagram of a symbol transfer period showing symbol boundary discontinuity.

With regard to FIG. 1, a cyclic functioning with the g-function is shown in accordance with the present invention. Here, OFDM symbol generation is subjected to a hard limiter in accordance with iteration control over n-iterations. It should be understood that the elements of FIG. 1 may be located within or used in conjunction with a peak power regulator of the structure and type described by McGowan within U.S. Pat. No. 6,931,053 and herein incorporated by reference. The clip signals, $x_{clip}$ and $y_{clip}$ are then filtered cyclically over the n-iterations by a g-function filter in conjunction with a delay element. Using the g-function as shown, effectively reduces the PAPR over an OFDM symbol period. Because OFDM symbols are generated independently, the signals at the symbol boundary may however present a discontinuity such that a large peak may occur at the boundary as seen by FIG. 2. In order to control the PAPR over the symbol transfer period, standard Cyclic Prefix and windowing techniques, as would be known to one skilled in the art, may be used after the PAPR reduction of the symbol.

Generation of the g-function basically includes reserving tones in the frequency domain, assigning weights to each reserved tones based on certain criteria, and performing IFFT to transfer these weighted reserved tones into the time domain. An example of such g-function and related reserve tones is shown graphically by way of FIG. 3 in terms of PAPR reduction in a WiMAX signal. Further, it is useful to assign location and weights to the reserve tones symmetrically so as to create a real component only g-function. Such modification would of course reduce computational complexity for carrying out the g-function filtering in accordance with the present invention.

It should be understood that further such modifications can be made according to performance and implementation criteria for any given application other than OFDM such that a given technical standard may place additional restrictions on the reserved spectrum. Further, in order to be able to implement a g-function filter with less complexity, it is possible to apply a truncating of the g-function, a windowing of the g-function, or fractioning (i.e., over-sizing) of the g-function to allow for "tones" centered between the usual OFDM center frequencies. Still further, it may be preferred to place the reserved tones in a specific manner such as spreading reserved tones as wide as possible, forming symmetrical pattern of reserved tone locations, or forming an irregular pattern of reserved tones locations. The inventive g-function filtering in accordance with the present invention allows for such variations in the location of the reserve tones and also makes it possible to implement this type of PAPR control method in software (e.g. a digital signal processor (DSP)) as well as hardware (e.g., an application specific integrated circuit (ASIC).

In designing an optimal g-function, the first criteria is to have a high ratio between the main peak filter tap magnitude and the average filter tap magnitude, while the second criteria is to minimize the energy of secondary peak filter tap magnitudes. The high main peak of the designed g-function provides efficient reduction of the peaks in the original communications symbol, while minimizing the energy of secondary peaks ensures less re-growth of peaks in other locations in the symbol. In addition it may be beneficial in some systems to provide one final iteration of cyclic processing with an all pass g-function, with a different clipping threshold than with the normal reserved tone based g-function, to provide a harder cut off of the symbol peaks with a small impact to signal quality or EVM.

The above-described embodiments of the present invention are intended to be examples only. Alterations, modifications, and variations may be effected to the particular embodiments by those of skill in the art without departing from the scope of the invention, which is defined solely by the claims appended hereto.

What is claimed is:

1. A method of reducing a peak-to-average power ratio (PAPR) in communications signals using reserve tones, said method comprising:
   obtaining a communications symbol;
   for n iterations, where n is a positive integer,
      subjecting said communications symbol to a hard limiter;
      defining clip signal components of said communications symbol;
      filtering said clip signal components using a g-function;
      providing a delay in conjunction with said defining and said filtering steps so as to form a delayed communications symbol; and
      subtracting an output of said filtering step from said delayed communications symbol so as to produce an output signal y(n) having a reduced PAPR;
   wherein said output y(n) is derived from the iteration $$y(n)=y(n-1)-\xi \cdot Gy_{clip}(n-1)$$

where $y_{clip}(n)$ is one said clip signal component, $\xi$ is a positive constant between 0 and 1, and G is a mapping matrix.

2. The method as claimed in claim 1, wherein said mapping matrix G is a matrix where each row and column is expressed as a cyclic shift of a g-function vector.

3. The method as claimed in claim 2, wherein $\xi$ is a constant value of 0.5.

4. The method as claimed in claim 3, wherein said g-function is formed by
   establishing a high ratio between a main peak filter tap magnitude and an average filter tap magnitude, and
   minimizing energy of any secondary peak filter tap magnitudes.

5. The method as claimed in claim 4, further including a step of
   providing one final iteration of cyclic processing with an all-pass g-function having a different clipping threshold than with said g-function so as to effect harder cut-off of symbol peaks.

6. The method as claimed in claim 5, wherein said method is performed within a mobile station.

7. The method as claimed in claim 5, wherein said method is performed within a base station.

8. The method as claimed in claim 5, wherein defining said clip signal components includes controlling a degree of clipping such that signal quality is maintained within predetermined specifications.

9. The method as claimed in claim 3, wherein said g-function is formed by assigning location and weights symmetrically to reserve tones so as to create a real-component-only g-function.

10. A filtering apparatus for use within a peak power regulator, said apparatus comprising:
    an iteration control mechanism for introducing n iterations of a communications symbol, where n is a positive integer;
    a hard limiter;
    a means for forming clip signal components of said communications symbol;
    a g-function filter for filtering said clip signal components;
    a delay mechanism in cooperation with said means for forming clip signal components and said g-function filter, said delay mechanism providing a delayed communications symbol; and
    a means for subtracting an output of said g-function filter from said delayed communications symbol so as to produce an output signal y(n) having a reduced PAPR;
    wherein an output y(n) formed by said apparatus is derived from the iteration $$y(n)=y(n-1)-\xi \cdot Gy_{clip}(n-1)$$

where $y_{clip}(n)$ is one said clip signal component, $\xi$ is a positive constant between 0 and 1, and G is a mapping matrix.

11. The apparatus as claimed in claim 10, wherein said G is a matrix where each row and column is expressed as a cyclic shift of a g-function vector.

12. The apparatus as claimed in claim 11, wherein $\xi$ is a constant value of 0.5.

13. The apparatus as claimed in claim 12, wherein said g-function is formed by
    establishing a high ratio between a main peak filter tap magnitude and an average filter tap magnitude, and
    minimizing energy of any secondary peak filter tap magnitudes.

14. The apparatus as claimed in claim 13, further including a means for providing one final iteration of cyclic processing with an all-pass g-function having a different clipping threshold than with said g-function so as to effect harder cut-off of symbol peaks.

15. The apparatus as claimed in claim 14, wherein said apparatus forms part of a mobile station.

16. The apparatus as claimed in claim 14, wherein said apparatus forms part of a base station.

17. The apparatus as claimed in claim 14, further including a means for defining said clip signal components so as to control a degree of clipping such that signal quality is maintained within predetermined specifications.

18. The apparatus as claimed in claim 13, wherein said g-function is formed by assigning location and weights symmetrically to reserve tones so as to create a real-component-only g-function.

* * * * *

UNITED STATES PATENT AND TRADEMARK OFFICE
CERTIFICATE OF CORRECTION

PATENT NO. : 7,583,583 B2  Page 1 of 1
APPLICATION NO. : 11/300508
DATED : September 1, 2009
INVENTOR(S) : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Fourteenth Day of September, 2010

David J. Kappos
*Director of the United States Patent and Trademark Office*